(12) United States Patent
    Hamabe et al.

(10) Patent No.: US 8,374,099 B2
(45) Date of Patent: Feb. 12, 2013

(54) COMMUNICATION SYSTEM, BASE STATION, MOBILE STATION, COMMUNICATION METHOD, AND PROGRAM

(75) Inventors: Kojiro Hamabe, Minato-ku (JP); Jinsock Lee, Minato-ku (JP)

(73) Assignee: NEC Corporation, Tokyo (JP)

( * ) Notice: Subject to any disclaimer, the term of this patent is extended or adjusted under 35 U.S.C. 154(b) by 520 days.

(21) Appl. No.: 12/597,673

(22) PCT Filed: Apr. 25, 2008

(86) PCT No.: PCT/JP2008/058034
§ 371 (c)(1),
(2), (4) Date: Oct. 26, 2009

(87) PCT Pub. No.: WO2008/136390
PCT Pub. Date: Nov. 13, 2008

(65) Prior Publication Data
US 2010/0128621 A1    May 27, 2010

(30) Foreign Application Priority Data

Apr. 27, 2007   (JP) ................................ 2007-118385

(51) Int. Cl.
*H04L 12/26*  (2006.01)
(52) U.S. Cl. ..... 370/252; 370/318; 370/349; 455/426.1; 455/458; 455/515
(58) Field of Classification Search ............... 370/252, 370/349, 318; 455/426, 458, 522, 426.1, 455/515
See application file for complete search history.

(56) References Cited

U.S. PATENT DOCUMENTS

| 4,745,408 | A  | * | 5/1988  | Nagata et al.  | 340/7.36  |
| 5,602,833 | A  | * | 2/1997  | Zehavi         | 370/209   |
| 6,240,288 | B1 | * | 5/2001  | Wan et al.     | 455/426.1 |
| 6,745,039 | B1 | * | 6/2004  | Di Lalla       | 455/458   |
| 6,963,750 | B1 | * | 11/2005 | Cheng et al.   | 455/458   |

(Continued)

FOREIGN PATENT DOCUMENTS

| CN | 1250334 A    | 4/2000  |
| JP | 2000-115073 A | 4/2000  |
| JP | 2006-319520 A | 11/2006 |

OTHER PUBLICATIONS

"Initial Standardisation Requirements from Self-Organizing Networks", Vodafone Group, 3GPP TSG RAN WG#257bis, R2-071532, Mar. 26-30, 2007, 5 pages, St. Julian's Malta.

(Continued)

*Primary Examiner* — Michael Thier
*Assistant Examiner* — Vincelas Louis
(74) *Attorney, Agent, or Firm* — Sughrue Mion, PLLC

(57) ABSTRACT

A base station (2) receives paging information for a mobile station (8) from gateway device (1), transmits the paging information after changing the amount of the radio resource of a paging channel, and measures a statistic associated with the completion of communication processing including at least a response of the paging information. The base station (2) then calculates a reception error rate of the paging information, based on the statistic. When receiving the paging information, the mobile station (8) transmits a response signal to the base station (8).

4 Claims, 10 Drawing Sheets

U.S. PATENT DOCUMENTS

| | | | | |
|---|---|---|---|---|
| 8,014,377 | B2* | 9/2011 | Zhang et al. | 370/349 |
| 2001/0029181 | A1* | 10/2001 | Verkama | 455/426 |
| 2005/0277429 | A1* | 12/2005 | Laroia et al. | 455/458 |
| 2007/0037602 | A1 | 2/2007 | Shimizu et al. | |
| 2009/0253453 | A1* | 10/2009 | Zhang et al. | 455/522 |

OTHER PUBLICATIONS

"Automatic Control of Paging Transmission Power", NEC, 3GPP TSG-RAN WG2#58, R2-071627, May 7-11, 2007, 4 pages, Kobe, Japan.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Technical Specification Group Radio Access Network; Mar. 2007, pp. 1-82.

Chinese Office Action dated Feb. 22, 2012 in counterpart Chinese Patent Application No. 200880013836.8.

* cited by examiner

| CASE | NUMBER OF CELLS IN TA | PAGING MESSAGE ERROR RATE | TOTAL PAGING MESSAGE | RESPONSE AT 1ST TRANSMISSION | TOTAL RETRANSMITTED PAGING MESSAGE | RESPONSE AT 2ND TRANSMISSION | ESTIMATED PAGING MESSAGE ERROR RATE |
|---|---|---|---|---|---|---|---|
| 1 | 4 | 40% | 1,000 | 0.25 x (1-0.4) x 1000 = 150 | 1000-150 =850 | 0.25 x 0.4 x (1-0.4) x 1000 = 60 | 60 / 150 = 40% |
| 2 | 4 | 1% | 1,000 | 0.25 x (1-0.01) x 1000 = 247 | 1000-247 =753 | 0.25 x 0.01 x (1-0.01) x 1000 = 2 | 2 / 247 = 0.8% |

COMMUNICATION SYSTEM, BASE STATION, MOBILE STATION, COMMUNICATION METHOD, AND PROGRAM

APPLICABLE FIELD IN THE INDUSTRY

The present invention relates to a communication system, a base station, a mobile station, a communication method, and a program.

BACKGROUND ART

The mobile communication system, as shown in FIG. 1, is configured of a gateway device 1, a plurality of base stations 2 to 4, and a mobile station 8. Each of the base stations 2 to 4, which constitutes one or a plurality of cells 5 to 7, makes communication with the mobile station being positioned in the above cell. The gateway device 1, which is connected to each of the base stations 2 to 4, and is connected to a high-rank network as well not shown in the figure, controls communication between the high-rank network and the mobile station existing in the cell of the base station that is under control thereof, and transfers information.

As such a system, for example, there exists E-UTRAN (Evolved Universal Terrestrial Radio Access Network), of which activity on standardization is ongoing, and its outline is described in Non-patent document 1.

In such a mobile communication system, a service area is divided into a plurality of position registration areas, and a plurality of the base stations 2 to 4 existing in each position registration area notify peculiar position registration area identification information. The mobile station 8 receives and stores the above identification information, and compares it with identification information that has been periodically received and stored. And, the mobile station 8, when the received identification information differs from the stored identification information, notifies the position registration information to the gateway device 1 via the base stations 2 to 4.

With this, when a terminal (not shown in the figure) connected to the high-rank network commences communication with the mobile station 8, the gateway device 1 cannot specify the base station with which the mobile station 8 is communicable, but can specify a position registration area 9 in which the mobile station 8 exists, whereby the gateway device 1 transmits paging information (calling information) of the mobile station 8 to each of the base stations 2 to 4 being included in the position registration area 9, and in addition, the base stations 2 to 4 transmits the paging information by employing a paging channel in cells 5 to 7, respectively.

Each of the base stations 2 to 4 transmits a pilot channel at a predetermined power, so the mobile station 8 measures reception powers of the pilot channels of the surrounding base stations 2 to 4 at a predetermined period, and receives the paging channel being transmitted by the base station of which the above reception power is maximum.

In FIG. 1, the mobile station 8 receives the paging channel of the base station 2, thereby to receive the paging information being transmitted from the base station 2, and transmits a response signal to the base station 2 because it exits in the cell 5 of the base station 2, so the transmission power of the pilot channel of the base station 2 is maximum. And, the base station 2 notifies the gateway device 1 that communication with the mobile station 8 is enabled in the base station 2. With this, the gateway device 1 connects the terminal that is going to commence the communication with the mobile station 8, and the mobile station 8 via the base station 2, thereby allowing the communication to be commenced.

This system necessitates setting the transmission power of the paging channel so that the paging information can be received at a reception error ratio within a desired range over the entirety of the cell for which each base station provides a communication service, and yet no excessive interference is given to the circumference. Such a transmission power differs depending upon a position relation with the base stations in the circumference of each base station, and a propagation environment. For this, the method is thinkable of calculating a probability (a reception error ratio) that when the base station transmits paging information to the mobile station, the mobile station fails in receiving the above information, and changing the transmission power so that the above reception error ratio falls under a certain range.

As shown in FIG. 9, when the mobile station fails in receiving the paging information, the gateway device retransmits the paging information after a lapse of a certain time. And, the method is thinkable in which the gateway device, when having received a response to the retransmission, determines that the reception error has occurred in a mobile station, increase the transmission power of the paging channel in the above base station, and when no reception error occurs, decreases the transmission power of the paging channel.

While, in this method, the gateway device controls the transmission power of the paging channel of each base station, it is desirable that the gateway device does not take a control associated with radio transmission between the base station and the mobile station, and the base station entirely takes such a control radio.

However, when, notwithstanding the transmission of the paging information, the base station was not able to receive its response, it cannot made a determination as to whether the cause is that the accessed mobile station did not exist within the cell of the above base station, or that the mobile station failed in receiving the paging information because a reception quality of the paging channel was not good even though the accessed mobile station existed within the cell of the above base station.

Thereupon, in Non-patent document 2, a scheme is described for enabling the base station to identify whether the response to the transmission of the paging information is a response to the first transmission or a response to the retransmission so that the base station can control the transmission power of the paging channel. In this scheme, as shown in FIG. 10, the gateway device affixes RSN (Retransmission Sequence Number) to the paging information, and transmits it. RSN=0 with the first transmission, and RSN=1 with the first retransmission. And, the base station as well transmits to the mobile station the paging information with this retransmission sequence number affixed, and this retransmission sequence number is affixed to the response as well by the mobile station. With this, from a number of times N1 of responses to the first transmission of the paging information, and a number of times N2 that the responses are received due to the retransmission, the base station approximately can estimate magnitude of the reception error ratio of the paging information in the mobile station within the cell with N2/(N1+N2), and hence can optimize the transmission power of the paging channel.

Non-Patent document 1: 3GPP TS 36.300 V8 (2007-03), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)

Non-patent document 2: R2-071532 (26-30 Mar. 2007), Initial Standardisation Requirements from Self-Organizing Networks

DISCLOSURE OF THE INVENTION

Problems to be Solved by the Invention

However, with the method in which calculates the reception error ratio and optimizes the transmission power, the gateway device needs to perform a process of optimizing the transmission powers of the paging channels of many base stations existing under control thereof, which causes a problem that a load concentrates upon the gateway device. In addition, there is also a problem that, while it is desirable for each base station to take the communication control responding to the radio environment thereof from a viewpoint of the function sharing between the devices, only this optimization of the transmission power of the paging channel has to be carried out by the gateway device.

Further, the method of employing the retransmission sequence number like the case of the technology of the Non-patent document 2 necessitates transmitting the retransmission sequence number together with the paging information by the gateway device and the base station, which causes a problem that the above transmission process is augmented, in addition the transmission information amount as well is augmented, and resultantly consumption of the radio resource in the transmission of the paging information and the transmission of its response is augmented.

That is, there is a problem that the base station cannot estimate the reception error ratio without transmitting the retransmission sequence number, and in addition, the base station cannot control the radio resource being employed for transmitting the paging information based upon the calculated reception error ratio.

Thereupon, the present invention has been accomplished in consideration of the above-mentioned problems, and an object thereof is to provide a technology that enables the base station to calculate the error ratio without the gateway device being involved in it and further without transmitting the transmission sequence number information etc.

Further, an object of the present invention is to provide a technology that enables each base station to optimize the radio resources being employed for transmitting the paging information based upon the error ratio calculated by the base station.

Means to Solve the Problem

The present invention for solving the above-mentioned is a communication system configured of a gateway device, at least one base station or more, and at least one mobile station or more, wherein: said base station comprises: a measurement unit for receiving predetermined information associate with said mobile station from said gateway device, changing a radio resource amount being employed for transmitting said predetermined information, transmitting said predetermined information to the mobile station, and measuring statistics associate with completion of a communication process including at least a response to said predetermined information; and a reception error ratio calculation unit for calculating a reception error ratio of said predetermined information based upon said statistics; and said mobile station comprises an information response unit for, when receiving said predetermined information, transmitting a response signal to said base station.

The present invention for solving the above-mentioned is a base station in a communication system, comprising: a measurement unit for changing a radio resource amount being employed for transmitting predetermined information, transmitting said predetermined information to a mobile station, and measuring statistics associate with completion of a communication process including at least a response to said predetermined information; and a reception error ratio calculation unit for calculating a reception error ratio of said predetermined information based upon said statistics.

The present invention for solving the above-mentioned is a mobile station in a communication system comprising a gateway device, at least one mobile station or more, and a base station for transmitting paging information received from said gateway device to said mobile station, and autonomously retransmitting the paging information when a signal of a response to paging information transmission cannot be received, comprising a means for controlling intermittent reception that corresponds to a retransmission interval of the paging information, and for, when having received paging information, transmitting a signal of a response to the above paging information to the base station.

The present invention for solving the above-mentioned is a communication method comprising: changing a radio resource amount being employed for transmitting predetermined information, transmitting said predetermined information to a mobile station, and measuring statistics associate with completion of a communication process including at least a response to said predetermined information; and calculating a reception error ratio of said predetermined information based upon said statistics.

The present invention for solving the above-mentioned is a program of a base station, causing the base station to execute the processes of: changing a radio resource amount being employed for transmitting predetermined information, transmitting said predetermined information to a mobile station, and measuring statistics associate with completion of a communication process including at least a response to said predetermined information; and calculating a reception error ratio of said predetermined information based upon said statistics.

An Advantageous Effect of the Invention

The present invention has an excellent effect that the base station can calculate the reception error ratio without the gateway device being involved in it and further without transmitting the transmission sequence number information etc.

In addition, the present invention has an effect as well that taking a control based upon the error ratio calculated by the base station makes it possible to realize the optimization of the radio resources being employed for transmitting control information of each base station.

Figure 1:
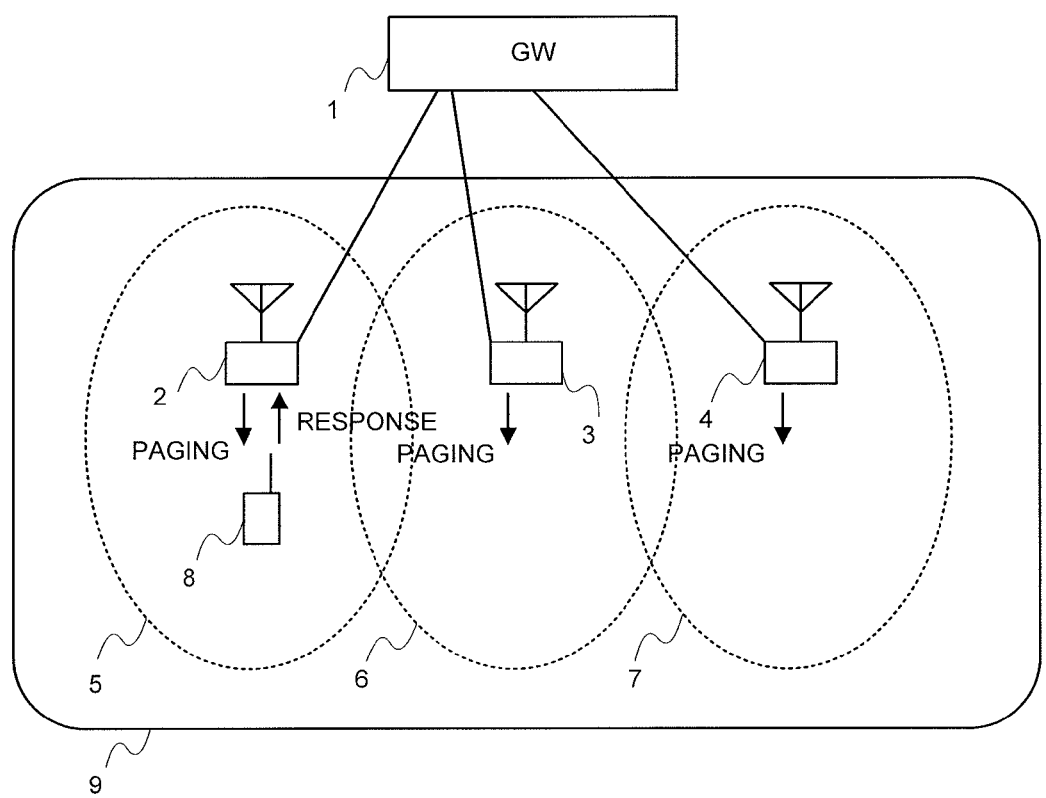
FIG. 1 is a configuration view of the mobile communication system for which the present invention is applied.

DESCRIPTION OF NUMERALS 1 gateway device
2 to 4 base stations
5 to 7 cells
8 mobile station
9 position registration area

BEST MODE FOR CARRYING OUT THE INVENTION

The embodiments of the present invention will be explained.

The present invention is characterized in that the base station measures statistics associated with completion of the communication process including a response to predetermined information by changing the radio resource amount being employed for transmitting the above predetermined information. And, it is characterized in that the base station calculates a reception error ratio for the transmission of the predetermined information based upon this statistics. Additionally, so as to facilitate understanding, paging information is employed as an example of the predetermined information for explanation.

Herein, the so-called completion of the communication process includes completion of a process ranging from the transmission of the paging information to a response to the above paging information and is not limited hereto, and when the completion of the communication process includes a process of transmitting/receiving the paging information, it may include completion of the data communication process, or the like. Further, the so-called statistics includes, for example, a response probability, being a probability that a response to the transmission of the paging information is made, a probability of failing in the response, or the like, and is not limited hereto. Further, the so-called change of the radio resource amount is a change of the number of times that the transmission of the paging information is repeated (namely, existence or not of the autonomous retransmission), an increase/decrease in the transmission power of the paging channel (an increase/decrease in the transmission power that is employed for transmitting the paging information), a change of a technique of modulating the paging channel (a change of a modulating technique being employed for transmitting the paging information, for example, a change from QPSK to 16QAM), a change of a coding ratio of the paging channel (a change of a coding ratio being employed for transmitting the paging information), or the like.

Next, a method of calculating the reception error ratio in the base station will be explained.

Herein, when the change of the radio resource amount is defined as the number of times that the transmission of the paging information is repeated, a probability that a response is received at the first transmission of the paging information as Pres1, and a probability that no response is made at the first transmission of the paging information and a response is received at the retransmission of the paging information as Pres2, and when it is assumed the reception error ratios at the first transmission and the retransmission of the paging information are identical to each other on the assumption that no much change of the reception environments exists between the first transmission and the retransmission, each of Pres1 and Pres2 behaves like $$Pres1 = Pexist \times (1-Perr)$$

$$Pres2 = Pexist \times Perr \times (1-Perr)$$

Where, Perr is a reception error ratio and Pexist is a probability that the accessible mobile station exists within the cell.

The reception error ratio Perr can be calculated as Perr=Pres2/Pres1 from these equations.

Thus, gaining Pres1, being a probability that the response is received at the first transmission of the paging information, and Pres2, being a probability that no response is made at the first transmission of the paging information and a response is received at the retransmission of the paging information by measuring them makes it possible to obtain the reception error ratio Perr of the paging information.

Further, the present invention is characterized in controlling the radio resource amount of the paging channel for transmitting the paging information by employing the reception error ratio gained as mentioned above. The base station controls the radio resource amount of the paging channel for transmitting the paging information so that, for example, the calculated reception error ratio is a permitted reception error ratio, thereby making it possible to automatically optimize the radio resource amount.

Hereinafter, the embodiments will be explained.

First Embodiment

Next, the first embodiment of the present invention will be explained. Additionally, in the first embodiment, the completion of the communication process is defined as completion of the process ranging from the transmission of the paging information to the response reception, and the case of calculating the reception error ratio of the paging information from the first response probability and the retransmission response probability, and controlling the transmission power of the paging channel based upon this reception error ratio will be explained.

FIG. 1 is a configuration view of the mobile communication system for which the present invention is applied. This mobile communication system is configured of a gateway device 1, a plurality of base stations 2 to 4, cells 5 to 7 of these base stations 2 to 4, a mobile station 8, and a position registration area 9 in which this mobile station 8 exists. While this mobile communication system includes many base stations and many mobile stations besides theses, illustration thereof is omitted. Additionally, explanation of an operation similar to the operation of the background art is omitted. Further, with regard to the technique of communication between each of the base stations 2 to 4 and the mobile station 8, the mobile communication system of the present invention may assume any technique; however, in the following explanation, it is assumed that a single carrier FDMA technique is employed for an uplink, and an OFDM technique for a downlink. Further, frequency carriers each of which differs from the other are employed for the uplink.

Figure 2:
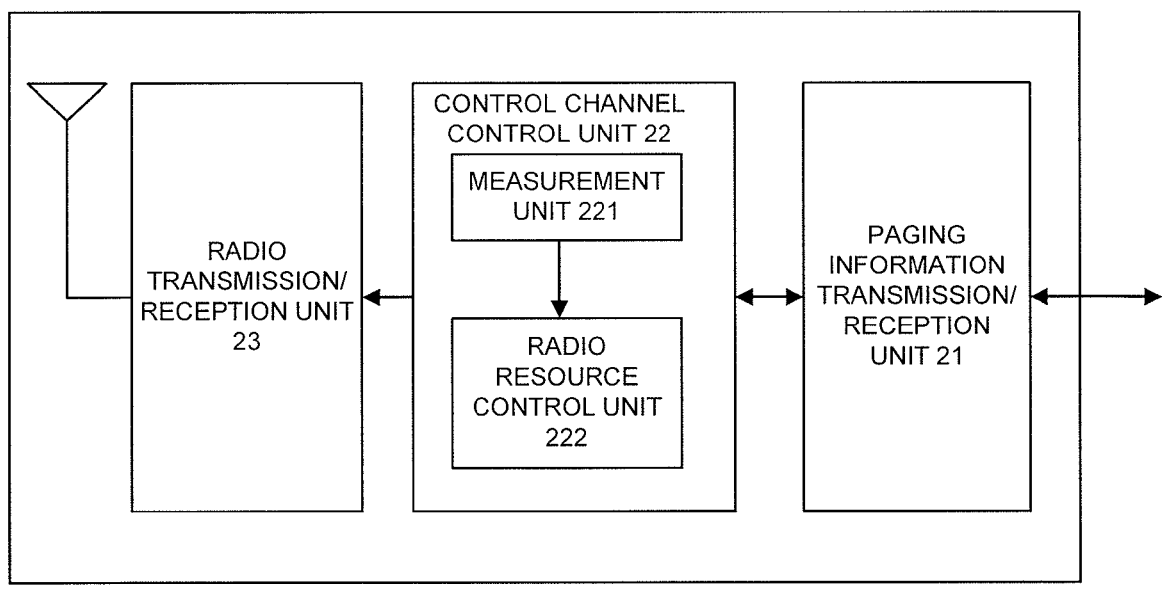
FIG. 2 is a block diagram of the base stations 2 to 4 in a first embodiment.

FIG. 2 is a block diagram of the base stations 2 to 4 in the first embodiment.

Each of the base stations 2 to 4 is provided with a paging information transmission/reception unit 21 for transmitting/receiving the paging information to/from the gateway device 1, a control channel control unit 22 for controlling the paging channel, and a radio transmission/reception unit 23 for transmitting/receiving the paging information at the transmission power for which an instruction has been given by the control channel control unit 22.

In addition, the control channel control unit 22 is provided with a measurement unit 221 for controlling the number of times that the paging information is transmitted to the mobile station, and measuring the number of times that the response is made for the different number of times of the transmission, and a radio resource control unit 222 for calculating the reception error ratio from the measured number of times of the responses, and controlling the radio resource amount of the paging channel (herein, a transmission power value) based upon this reception error ratio.

Figure 3:
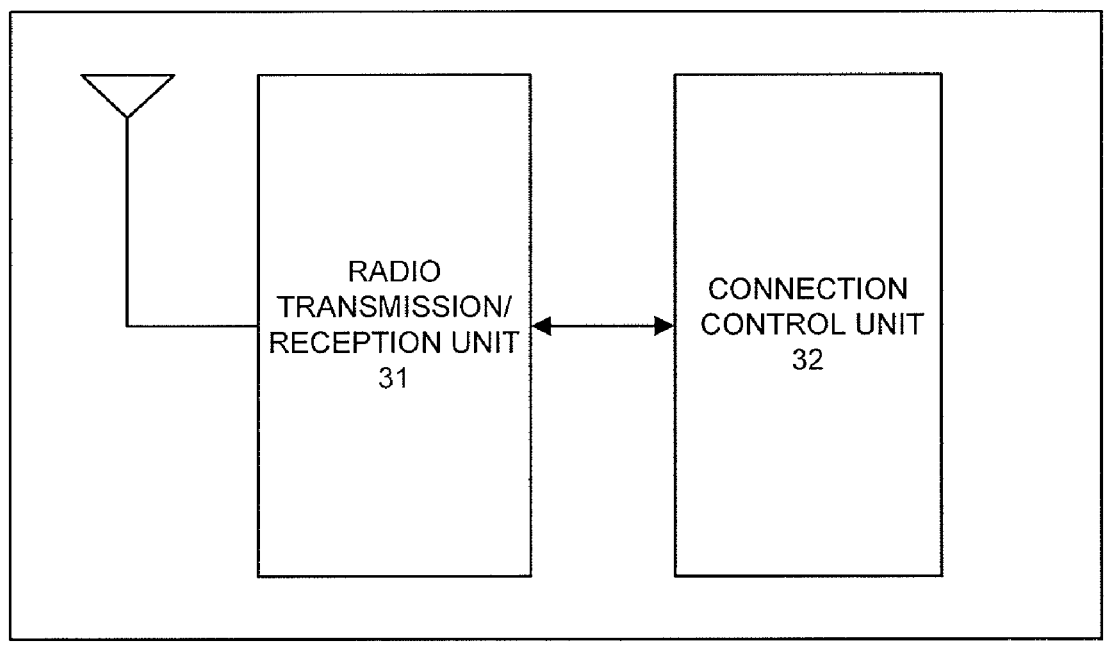
FIG. 3 is a block diagram of the mobile station 8.

FIG. 3 is a block diagram of the mobile station 8.

The mobile station 8 is provided with a radio transmission/reception unit 31 for receiving paging information coming from the base stations 2 to 4, and further transmitting a signal of the response to the above paging information, and a connection control unit 32 for controlling intermittent reception that corresponds to a retransmission interval of the paging information, and for, when receiving paging information, transmitting a signal of the response to the above paging information via the radio transmission/reception unit 31.

Next, an operation in the foregoing configuration will be explained.

Figure 4:
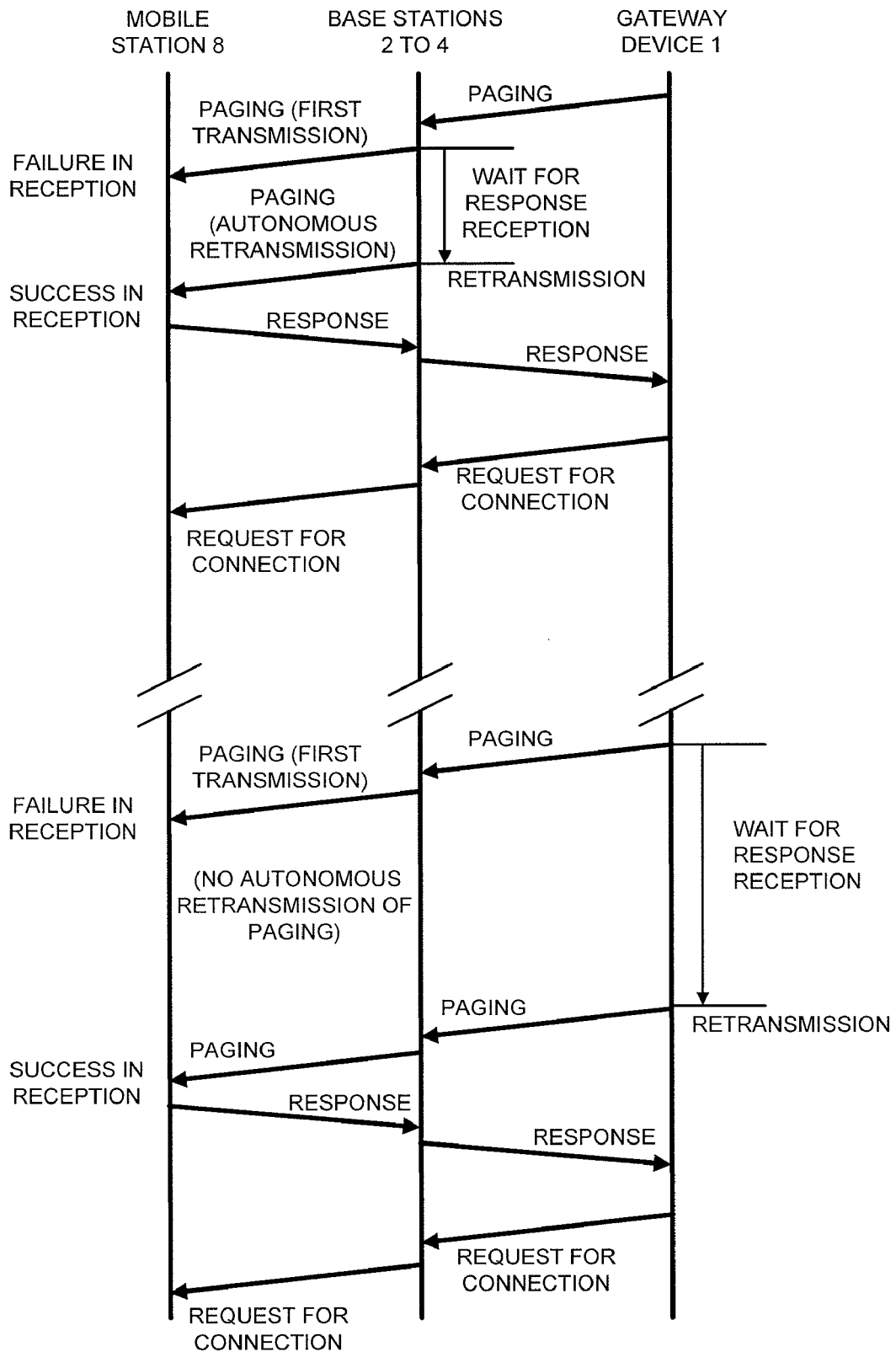
FIG. 4 is a diagram of a sequence among the gateway device 1, the base stations 2 to 4, and the mobile station 8.

FIG. 4 is a diagram of a sequence among the gateway device 1, the base stations 2 to 4, and the mobile station 8.

In the first embodiment, when each of the base stations 2 to 4 cannot receive the signal of the response to the transmission of the paging information from the mobile station 8, it autonomously retransmits the paging information at a predetermined probability. Upon making explanation specifically by employing the sequence diagram of FIG. 4, when each of the base stations 2 to 4 receives the paging information from the gateway device 1, it decides the paging information that is autonomously retransmitted at a pre-decided constant probability (for example, a probability of 1%). And, when the base station carries out the first transmission of the paging information to the mobile station 8, and cannot receive the signal of the response to the first transmission from the mobile station 8, it autonomously retransmits the paging information, and tries to receive the signal of the response to the retransmission.

An upper half of FIG. 4 shows a sequence in which the mobile station 8 transmits the response to the autonomous retransmission, and the gateway device 1 transmits a request for connection for it, and a lower half of FIG. 4 shows a sequence in which the base stations 2 to 4 do not carry out the autonomous retransmission of the paging information, and the gateway device 1 retransmits the paging information due to termination of a waiting time for the reception response.

Figure 5:
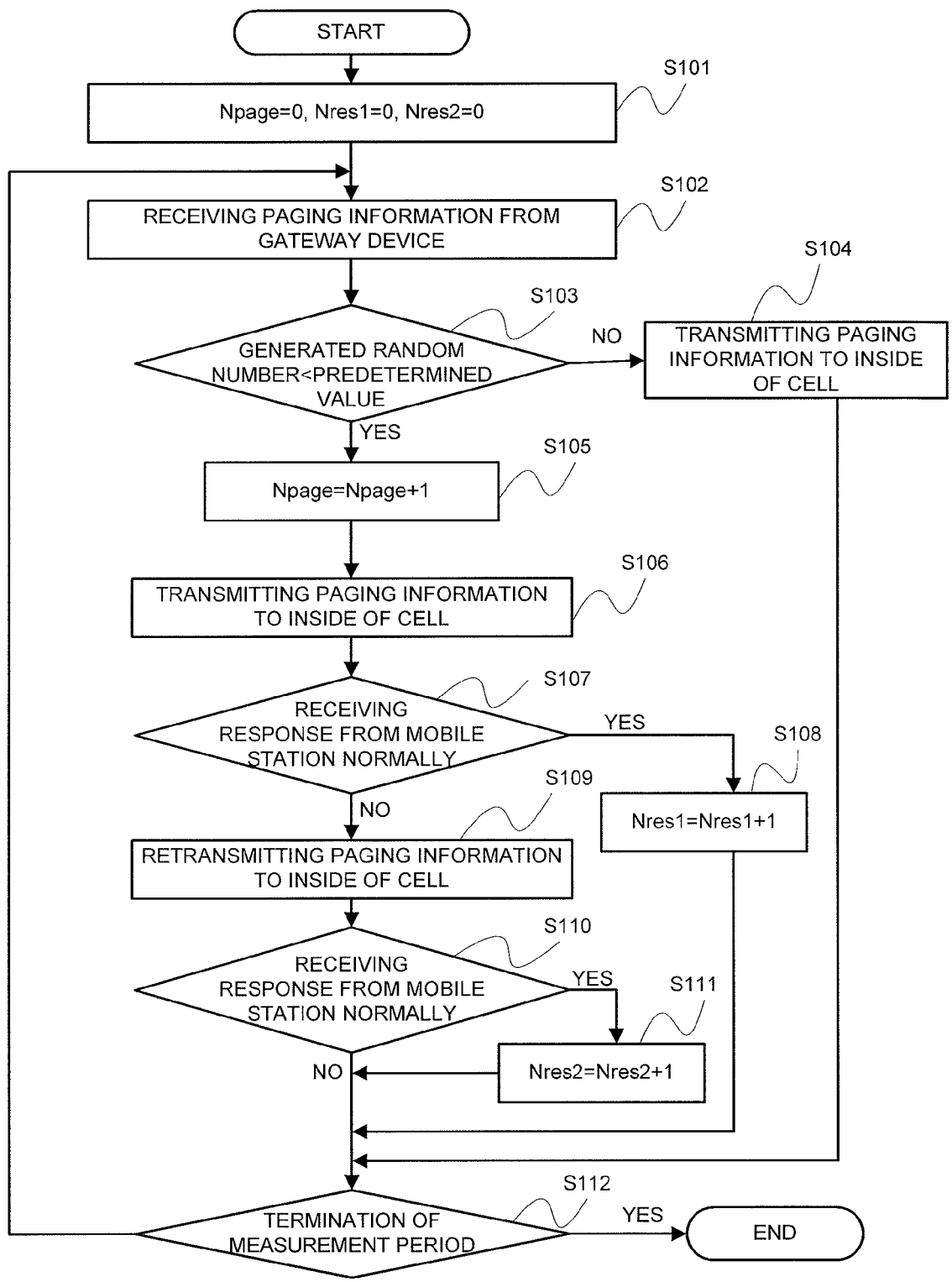
FIG. 5 is an operational flowchart of a measurement unit 221 in the first embodiment.

FIG. 5 is an operational flowchart of the measurement unit 221, being a flowchart of counting the number of times that the paging information, which becomes a target of being autonomously retransmitted when no response to first transmission, is transmitted, the number of times of the responses to the above first transmission, and the number of times of the responses to the retransmission for a predetermined measurement period.

Upon making a reference to FIG. 5, the measurement unit 221 initializes Npage, being the number of times that the autonomous retransmission process of retransmitting the paging information is performed when no response to the first transmission of the paging information is made, Nres1, being the number of times that the responses to the first transmission of the paging information are received, and Nres2, being the number of times that the responses to the retransmission of the paging information are received, to 0 (zero), respectively (step S101).

Upon receipt of the paging information from the gateway device 1 (step S102), the measurement unit 221 generates a random number, and compares the above random number with a predetermined value (step S103).

When the generated random number is equal to or more than the predetermined value, the measurement unit 221 transmits the paging information to the inside of the cell in a normal transmission mode of the paging information (step S104), and then the operation proceeds to a step S112.

On the other hand, when the generated random number is smaller than the predetermined value, the measurement unit 221 enters a mode of autonomously retransmitting the paging information, adds 1 to Npage (step S105), and transmits the paging information to the inside of the cell (step S106). And, it judges whether to receive the response to the paging information coming from the mobile station (step S107).

When the measurement unit 221 has normally received the response from the mobile station, it adds 1 to Nres1 (step S108), and then the operation proceeds to the step S112.

On the other hand, when the measurement unit 221 was not able to normally receive the response coming from the mobile station in the step S107, it retransmits the paging information to the inside of the cell (step S109), and judges whether to receive the response to the paging information coming from the mobile station (step S110).

When the measurement unit 221 has normally received the response from the mobile station, it adds 1 to Nres2 (step S111), and then the operation proceeds to the step S112. On the other hand, when the measurement unit 221 has normally not received the response coming from the mobile station in the step S111, the operation proceeds to the step S112.

In the step S112, when the predetermined measurement period has not been terminated, the operation proceeds to the step S102, and when it has been terminated, the process of the flowchart of FIG. 5 is finished.

Additionally, in the step S103, the random number being generated is a uniformly random number ranging from 0 to 1, and 0.01 is pre-set to the predetermined value as a probability that the retransmission is carried out. When this probability that the retransmission is carried out is too large, the consumption of the radio resource due to the retransmission becomes large, and when this probability is too small, the time is necessitated for counting Nres2 etc. necessary for calculating a probability that no response to the first transmission is made and the response to the retransmission is made with a sufficient precision. Thus, the value of 0.01 to 0.1 is desirable.

Further, in the judgment in the step S103, when the generated random number and the predetermined value are identical to each other, the normal transmission mode may be employed, or the autonomous retransmission mode may be employed, and the transmission mode may be appropriately decided at the time of designing.

In addition, the predetermined measurement period of the step S112 is defined as a constant period (for example, one hour) that elapses after the commencement of the flow of FIG. 5. Further, the time point that Npage exceeds a constant number (for example, 10000), or the time point that Nres2 exceeds a constant number (for example, 100) may be defined as a point that the predetermined measurement period is terminated instead of defining the predetermined measurement period as a constant time.

Figure 6:
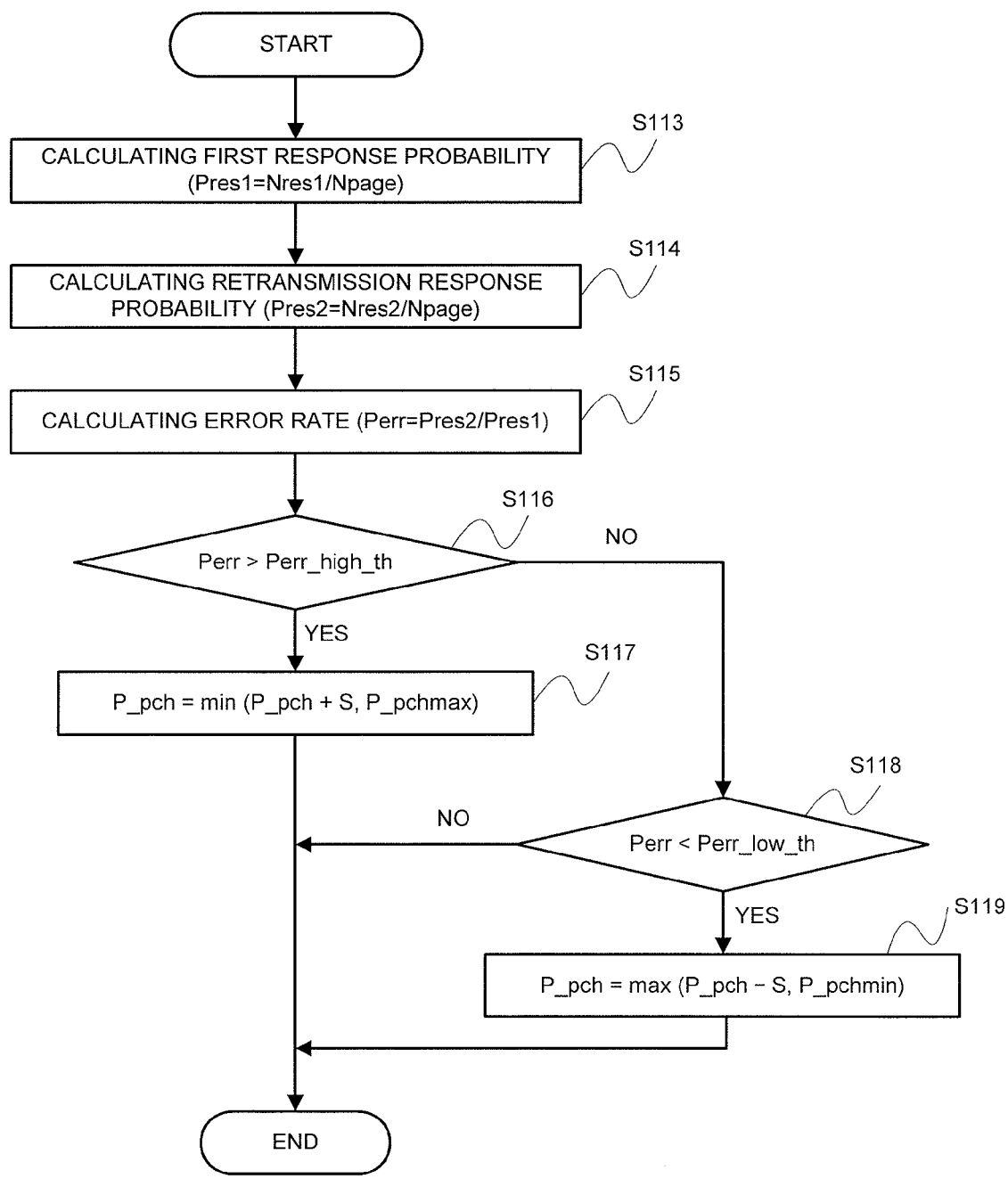
FIG. 6 is an operational flowchart of a radio resource control unit 222 in the first embodiment.

When the measurement unit 221 finishes the process of FIG. 5, the radio resource control unit 222 performs a process of FIG. 6. FIG. 6 is an operational flowchart of the radio resource control unit 222, being a flowchart in which the radio resource control unit 222 changes the radio resource amount of the paging channel (increases/decreases the transmission power) by employing a measurement result by the measurement unit 221.

Upon making a reference to FIG. 6, the radio resource control unit 222 calculates a response probability Pres1 that the response to the first transmission of the paging information is made (step S113). Pres1 is calculated as Nres1/Npage. Continuously, the radio resource control unit 222 calculates a response probability Pres2 that no response to the first transmission of the paging information is made and the response to the retransmission is made (step S114). Pres2 is calculated as Nres2/Npage. And, the radio resource control unit 222 calculates the reception error ratio Perr of the paging information of the first transmission and the retransmission (step S115). This reception error ratio Perr of the paging information of the first transmission and the retransmission can be obtained from the following equations as described above.

$Pres1 = Pexist \times (1 - Perr)$ $Pres2 = Pexist \times Perr \times (1 - Perr)$ Where, Perr is a reception error ratio at the time of having transmitted the paging information once, and Pexist is a probability that the accessible mobile station exists within the cell. The reception error ratio Perr at the time of having transmitted the paging information once can be calculated as Perr=Pres2/Pres1 from these equations.

Next, the radio resource control unit 222 compares the calculated Perr with a predetermined threshold Perr_high_th (step S116).

When Perr is larger than the predetermined threshold Perr_high_th, the radio resource control unit 222 increases a transmission power P_pch of the paging channel by a predetermined amount S within a range in which P_pch does not exceeds an upper limit P_pchmax (step S117).

On the other hand, in the step S116, when Perr is equal to or less than the predetermined threshold Perr_high_th, the radio resource control unit 222 compares Perr with a predetermined threshold Perr_low_th (step S118). When Perr is smaller than Perr_low_th, the radio resource control unit 222 decreases P_pch by a predetermined amount S within a range in which P_pch does not fall below a lower limit P_pchmin (step S119). Additionally, while it is assumed that the predetermined amounts S of the step S117 and that of the step S119 are identical to each other, these predetermined amounts may differ from each other in the value. Further, each of P_pch and S could be a linear value and could be a decibel value, and herein is assumed to be a decibel value.

Further, in the judgment in the step S116 and the step S118, a determination as to which step the operation proceeds to is appropriately made at the time of designing when Perr is identical to the predetermined threshold Perr_high_th, or the predetermined threshold Perr_low_th.

Doing so as mentioned above makes it possible to automatically optimize the transmission power of the paging channel within a range of the lower limit P_pchmin and the upper limit P_pchmax thereof so that the reception error ratio of the paging information falls under a range of Perr_low_th and Perr_high_th. That is, the transmission power can be automatically controlled within the permitted reception error ratio so that the transmission power is minimized.

Additionally, while, in the foregoing explanation of FIG. 6, the response probability Pres1 that the response to the first transmission of the paging information was made was calculated in the step S113, and the response probability Pres2 that no response to the first transmission of the paging information was made and the response to the retransmission was made was calculated in the step S114, the reception error ratio Perr may be obtained without these response probabilities calculated. A flowchart in this case is shown in FIG. 11.

Figure 11:
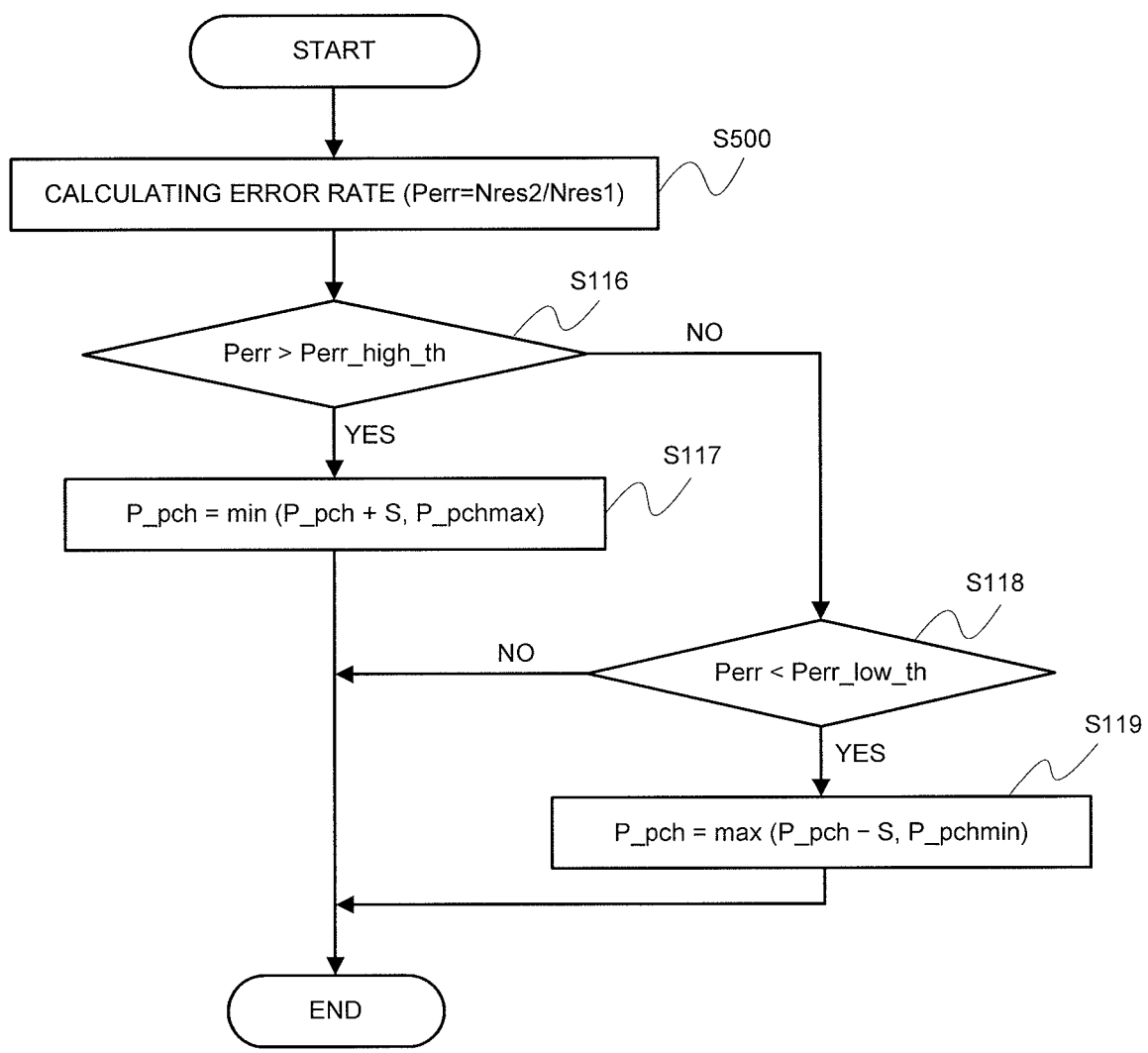
FIG. 11 is an operational flowchart illustrating another operational example of the radio resource control unit 222 in the first embodiment.

A point in which FIG. 11 differs from FIG. 6 is that the operations of the step S113 and the step S114 are excluded, and the reception error ratio Perr is obtained as Perr=Nres2/Nres1 in a step S500.

As described above, the reception error ratio Perr can be calculated as Perr=Pres2/Pres1.

Thus, $Perr = Pres2/Pres1$ $= (Nres2/Npage)/(Nres1/Npage)$ $= Nres2/Nres1$

In such a manner, the reception error ratio Perr can be obtained even though the response probability Pres1 and the response probability Pres2 are not calculated.

The other steps of FIG. 11 are similar to the operation of FIG. 6 described above, so its explanation is omitted.

Second Embodiment

The second embodiment will be explained.

In the first embodiment, an example was explained in which the base station measured the completion of the communication process by changing the radio resource amount in such a manner that the base station autonomously retransmitted the paging information when it was not able to receive the signal of the response to the transmission of the paging information from the mobile station at the predetermined probability.

In the second embodiment, the base station increase/decreases the power of the paging channel at a predetermined probability, changes the radio resources amount, and transmits the paging information instead of employing the autonomous retransmission. And, an example of calculating the reception error ratio of the paging information, and optimizing the power of the paging channel based upon this will be explained.

Figure 7:
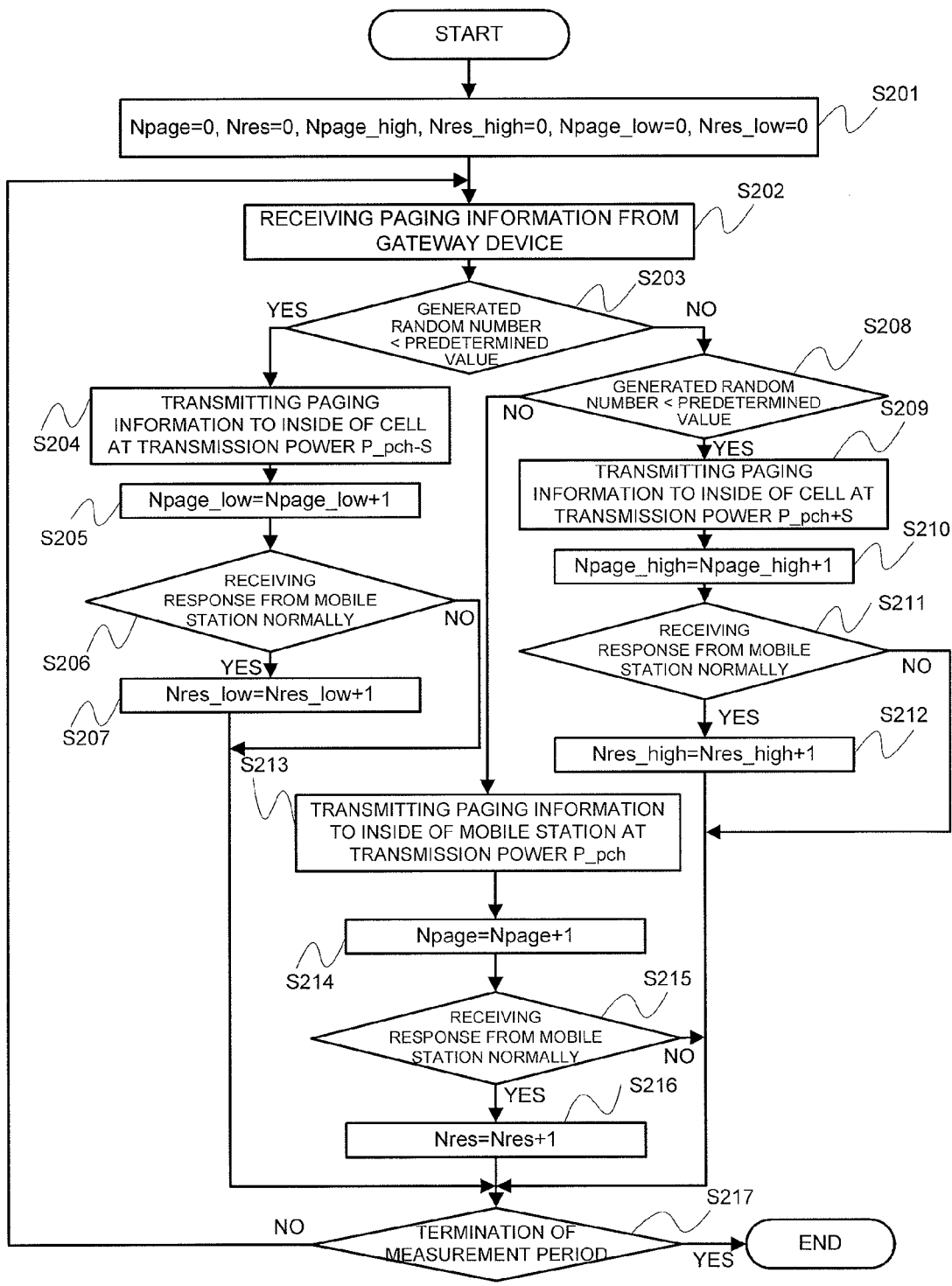
FIG. 7 is an operational flowchart of the measurement unit 221 in a second embodiment.

FIG. 7 is an operational flowchart of the measurement unit 221, being a flowchart of measuring the number of times that the paging information is transmitted at each transmission power, and the number of times of the responses for a predetermined measurement period.

Upon making a reference to FIG. 7, the measurement unit 221 initializes the number of times Npage that paging information is transmitted at the current transmission power, the number of times Nres that the response to the transmission of the above paging information is received, the number of times Npage_high that paging information is transmitted at a transmission power higher than the current transmission power, the number of times Nres_high that the response to the transmission of the above paging information is received, the number of times Npage_low that paging information is transmitted at a transmission power lower than the current transmission power, and the number of times Nres_low that the response to the transmission of the above paging information is received to 0 (zero), respectively (step S201).

Upon receipt of the paging information from the gateway device 1 (step S202), the measurement unit 221 generates a random number, and compares the above random number and a predetermined value (step S203).

When the generated random number is smaller than the predetermined value, the measurement unit 221 transmits the paging information at a transmission power P_pch−S lower than the current transmission power (step S204), and adds 1 to Npage_low (step S205). And, it judges whether the response to the transmission thereof has been normally received from the mobile station (step S206). And, when the measurement unit 221 has normally received the response to the above transmission from the mobile station, it adds 1 to Nres_low (step S207), and then the operation proceeds to a step S217. Further, when the measurement unit 221 has not received the response to the above transmission in the step S206 from the mobile station, it does not add 1 to Nres_low, and then the operation proceeds to the step S217.

On the other hand, when the random number generated in the step S203 is equal to or more than the predetermined value, the measurement unit 221 furthermore generates another random number, and compares the above random number with the predetermined value (step S208). When the random number generated in the step S208 is smaller than the predetermined value, the measurement unit 221 transmits the paging information at a transmission power P_pch+S higher than the current transmission power (step S209), and adds 1 to Npage_high (step S210). And, it judges whether the response to the above transmission has been normally received from the mobile station (step S211). And, when the measurement unit 221 has normally received the response, it adds 1 to Nres_high (step S212), and then the operation proceeds to a step S217. When the measurement unit 221 was not able to receive the response, the operation proceeds to the step S217.

On the other hand, when the random number generated in the step S208 is equal to or more than a predetermined value different from the predetermined value of the step S203, the measurement unit 221 transmits the paging information at a current transmission power P_pch (step S213), and adds 1 to Npage (step S214). And, the measurement unit 221 judges whether the response to the above transmission has been normally received from the mobile station (step S215), and when it has normally received the response, and it adds 1 to Nres (step S216), and the operation proceeds to the step S217. When the measurement unit 221 was not able to receive the response, the operation proceeds to the step S217.

In the step S217, when the predetermined measurement period has not been terminated, the operation proceeds to the step S202, and when it has been terminated, the process of the flowchart of FIG. 7 is finished.

The predetermined measurement period of the step S217 is defined as a constant time (for example, one hour) that elapses after the commencement of the flow of FIG. 7. Further, the time point that both of Npage_low and Npage_high exceed a constant number (for example, 10000), or the time point that both of Nres_low and Nres_high exceed a constant number (for example, 100) may be defined as a point that the predetermined measurement period is terminated instead of defining the predetermined measurement period as a constant time.

Further, in the judgment in the step S203 and the step S208, a determination as to which step the operation proceeds to is appropriately made at the time of designing when the generated random number and the predetermined value are identical to each other.

Figure 8:
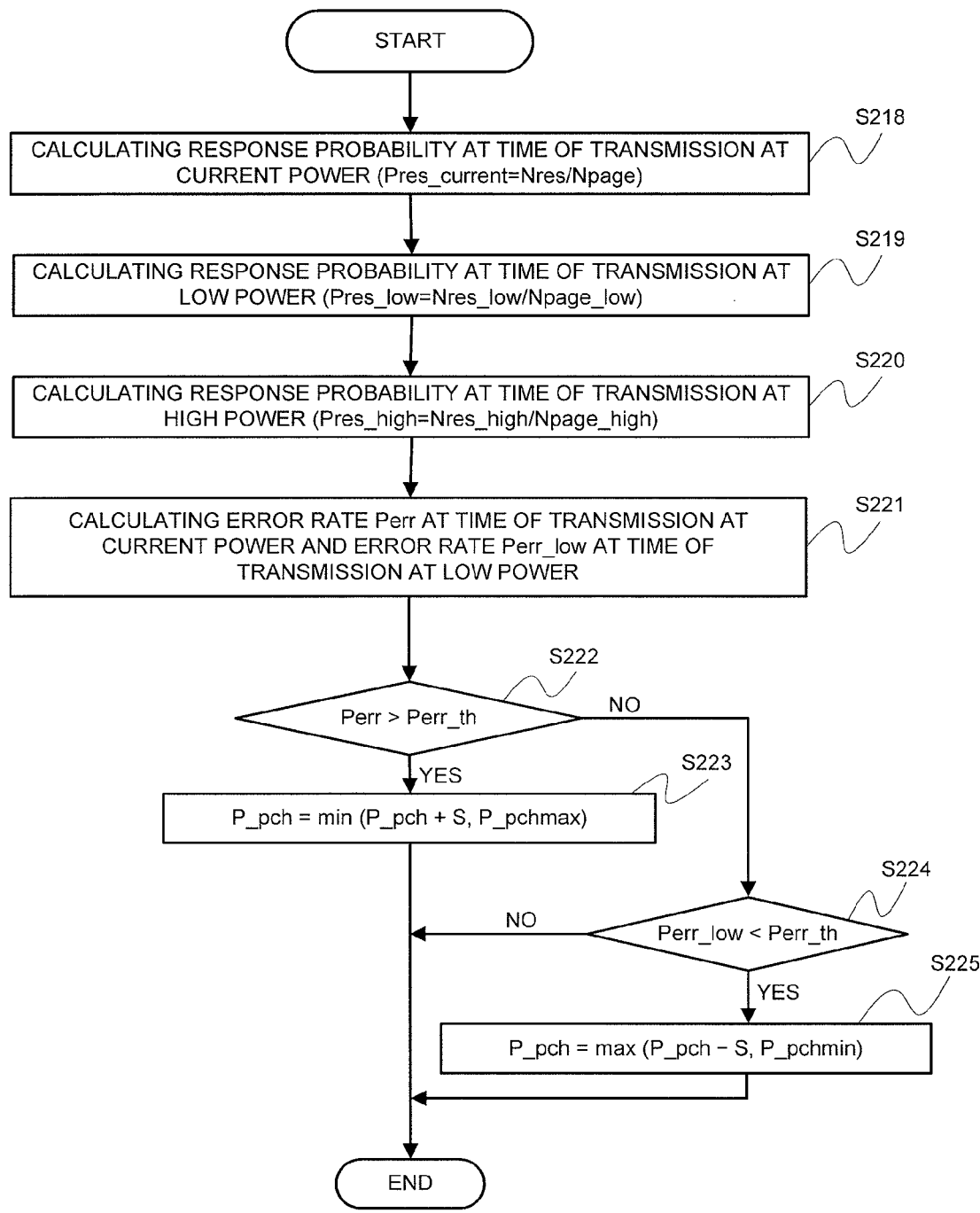
FIG. 8 is an operational flowchart of the radio resource control unit 222 in the second embodiment.
Figure 9:
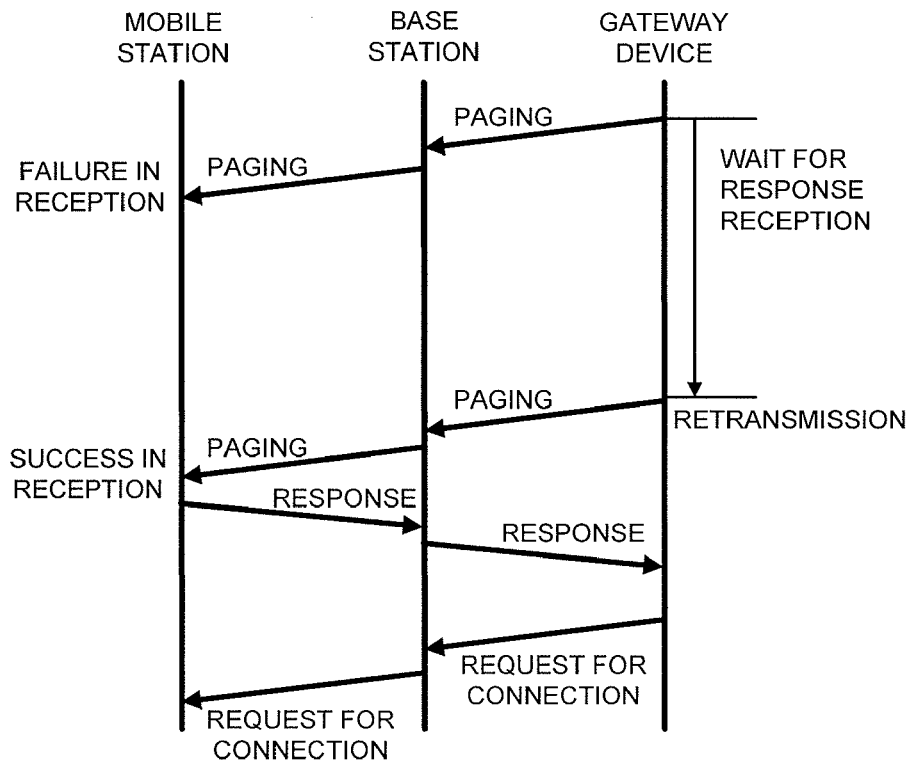
FIG. 9 is a diagram illustrating a sequence in which the gateway device retransmits the paging information in the prior art.
Figure 10:
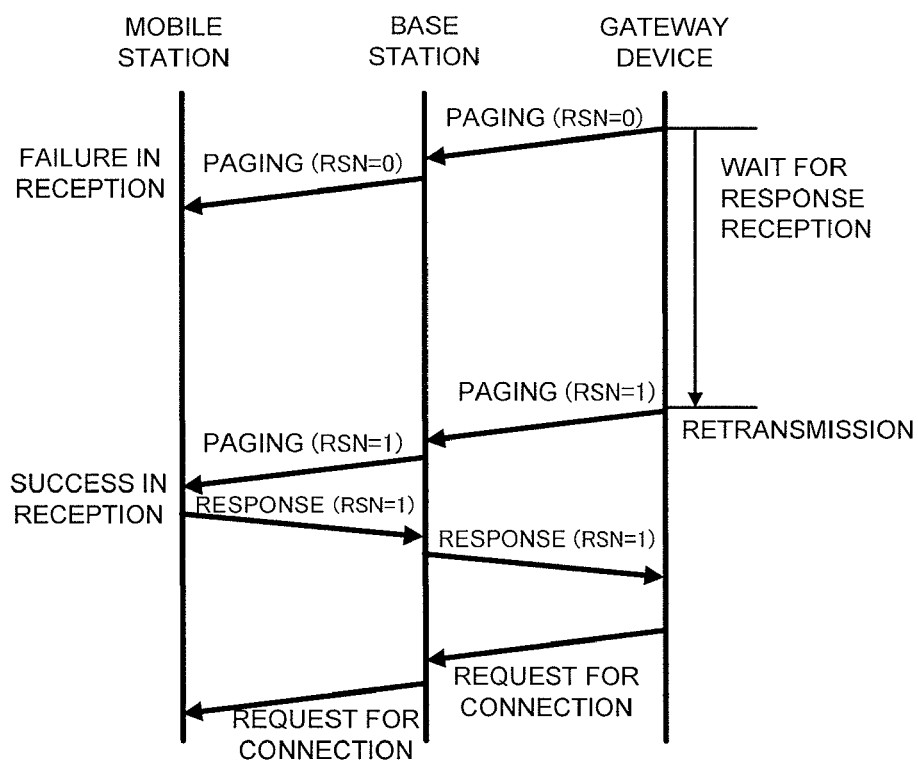
FIG. 10 is a diagram illustrating a sequence in which the gateway device retransmits the paging information with the retransmission sequence number affixed in the prior art.

When the measurement unit 221 finishes the process of FIG. 7, the radio resource control unit 222 performs a process of FIG. 8. FIG. 8 is an operational flowchart of the radio resource control unit 222, being a flowchart in which the radio resource control unit 222 increases/decreases the transmission power of the paging channel by employing a measurement result by the measurement unit 221.

Upon making a reference to FIG. 8, the radio resource control unit 222 calculates a response probability Pres_current that the response to the transmission of the paging information at the current transmission power is made (step S218). Pres_current can be calculated as Nres/Npage.

The radio resource control unit 222 calculates a response probability Pres_low that the response to the transmission of the paging information at a transmission power lower than the current transmission power is made (step S219). Pres_low can be calculated as Nres_low/Npage_low.

Likewise, the radio resource control unit 222 calculates a response probability Pres_high as well that the response to the transmission of the paging information at a high transmission power is made (step S220). Pres_high can be calculated as Nres_high/Npage_high.

And, the radio resource control unit 222 calculates a reception error ratio Perr of the paging information at the time of the transmission at the current transmission power, and a reception error ratio Perr_low of the paging information at the time of the transmission at the low transmission power (step S221).

Herein, in the step S221, Perr and Perr_low are calculated as follows. At first, when a probability that the accessible mobile station exists in the cell is defined as Pexist, and a reception error ratio at the time of transmitting the paging information at a transmission power higher than the current transmission power as Perr_high, the following equations hold.

$$Pres\_current = Pexist \times (1 - Perr)$$

$$Pres\_low = Pexist \times (1 - Perr\_low)$$

$$Pres\_high = Pexist \times (1 - Perr\_high)$$

Herein, when it is assumed that Perr_high=0 on the assumption that no reception error occurs almost at the time of the high transmission power, Pexist=Pres_high is yielded, and Perr and Perr_low can be calculated with following equations by employing Pres_current, Pres_low, and Pres_high calculated in the steps S218 to S220, respectively.

$$Perr = 1 - Pres\_current / Pres\_high$$

$$Perr\_low = 1 - Pres\_low / Pres\_high$$

Next, the radio resource control unit 222 compares Perr with a predetermined threshold Perr_th (step S222), and when Perr is larger than the predetermined threshold Perr_th, the radio resource control unit 222 increases a transmission power P_pch of the paging channel by a predetermined amount S within a range in which P_pch does not exceeds an upper limit P_pchmax (step S223).

When Perr is equal to less than Perr_th in the step S222, the radio resource control unit 222 compares Perr_low with the predetermined threshold Perr_th (step S224). When Perr_low is smaller than the predetermined threshold Perr_th, the radio resource control unit 222 decreases P_pch by a predetermined amount S within a range in which P_pch does not fall below a lower limit P_pchmin (step S225).

When Perr_low is more than a predetermined threshold Perr_th in the step S222, the process is finished.

While the predetermined amounts S of the steps S204, S209, S223, and S225 were assumed to be identical to each other, these predetermined amounts may differ from each other in the value. Further, each of P_pch and S could be a linear value and could be a decibel value, and herein it is assumed to be a decibel value.

Further, when Perr is identical to the predetermined threshold Perr_th in the judgment in the step S222, and when Perr_low is identical to the predetermined threshold Perr_th in the judgment in the step S224, a determination as to which step the operation proceeds to is appropriately made at the time of designing.

Doing so as mentioned above makes it possible to automatically optimize the transmission power of the paging channel while the reception error ratio of the paging information is kept so as not to exceed Perr_th so that the transmission power is minimized within a range of the lower limit P_pchmin and the upper limit P_pchmax thereof, and yet within a range of the permissible level of the error ratio.

Additionally, in this embodiment, the reception error ratio Perr_low of the paging information at the time of the transmission at a transmission power lower than the current transmission power is calculated and obtained; however, the reception error ratio Perr of the paging information at the time of the transmission at the current transmission power is obtained not by calculating this reception error ratio Perr_low, but by employing the probability Pres_current that the response to the transmission of the paging information at the current transmission power is made, and the probability Pres_high that the response to the transmission of the paging information at a transmission power higher than the current transmission power is made, and with this magnitude, the transmission power of the paging channel can be also controlled.

Additionally, in this embodiment, the random number being generated in the steps S203 and S208 is a uniformly random number ranging from 0 to 1, and 0.01 is pre-set to the predetermined value as a probability that the transmission is carried out at the low transmission power and at the high transmission power. When this probability is too large, a problem that the reception error ratio of the paging information becomes high due to the transmission at the low power is raised, and a problem that the consumption of the radio resource is augmented due to the transmission at the high power is raised. To the contrary, when this probability is too small, the time is necessitated for counting the number of times of the transmission and the number of times of the responses hereto necessary for calculating a response probability at each transmission power with a sufficient precision. Further, increasing/decreasing the transmission power of the paging channel leads to an increase/decrease in the retransmission probability of the paging information accordingly. For example, in the case of having raised a frequency that the paging information is transmitted at the low transmission power in another cell, and of having transmitted the paging information at the normal transmission power in its own cell, while the number of times that the paging information is transmitted is greatly augmented due to an increase in the retransmission of the paging information that aims for another cell, the number of times that the response to the paging information is made is not changed in its cell, whereby a probability that the response to the transmission of the paging information at the normal power is made is underestimated, and the estimation error could become large.

Thus, the ratio at which the paging channel is increased/decreased is desirably lowered to 0.01 or so, and this brings about an effect of being able to accurately estimate a response probability that the response to the transmission of the paging information at each transmission power is made.

In addition, in the foregoing embodiments, the present invention was explained on the assumption that the statistics associated with the completion of the communication process including the response of the paging information was employed; however the present invention does not need to be always limited to the fact that the statistics associated with the completion of the communication process including the response of the paging information is employed, and the statistics associated with the completion of the process of transmitting information by employing a common channel, and receiving a response hereto may be employed.

For example, the present invention is applicable to simulcast transmission as well for executing a broadcast service via the mobile communication network. For the simulcast transmission of the data employing the common channel, a scheme etc. can be executed of: when the mobile station transmits a acknowledgement of the data to the base station, calculating the reception error ratio of the simulcast data employing a acknowledgement ratio (for example, a acknowledgement ratio in the case of having transmitted the data once, and a acknowledgement ratio in the case of having transmitted the data twice) at the time of employing the radio resource amount different from that of the simulcast transmission; and increasing the transmission power of the common channel for transmitting the simulcast data when the reception error ratio is higher than the predetermined value, and decreasing the transmission power when it is equal to or less than the predetermined value in line with the first embodiment.

Further, the present invention is also applicable to a change of the power of a broadcast channel for communication control. For example, it is possible to take a control such that a reception error ratio of notification of power offset information of RACH (Random Access Channel) is calculated by utilizing the statistics gained by changing the radio resource amount being employed for the notification, and when the reception error ratio is larger than the predetermined value, the power offset value is raised (in this case, the maximum value may be set), and when the reception error ratio is smaller than the predetermined value, the power offset value is lowered (in this case, the minimum value may be set). Further, it is also acceptable that not only the transmission power of the paging channel is changed by employing the statistics associated with the completion of the communication process including the response of the paging information, but also the transmission power of the other broadcast channel is changed at an identical ratio.

In addition, needless to say, the present invention is also applicable to each of the power change of the channel for transmitting the simulcast data for broadcast and the power change of the broadcast channel for communication control in line with the second embodiment.

Additionally, in the foregoing first embodiment and second embodiment, the paging information transmission/reception unit 21, the control channel control unit 22, the radio transmission/reception unit 23, the measurement unit 221, and the radio resource control unit 222 of the base station were configured with hardware, and one part thereof or the entirety can be also configured with an information processing device that operates under a program.

Example 1

Specific examples of the present invention will be explained. In this example, the case of applying the present invention for the communication technique by 3 GPP (3rd Generation Partnership Project) will be explained.

Figures 12, 13:
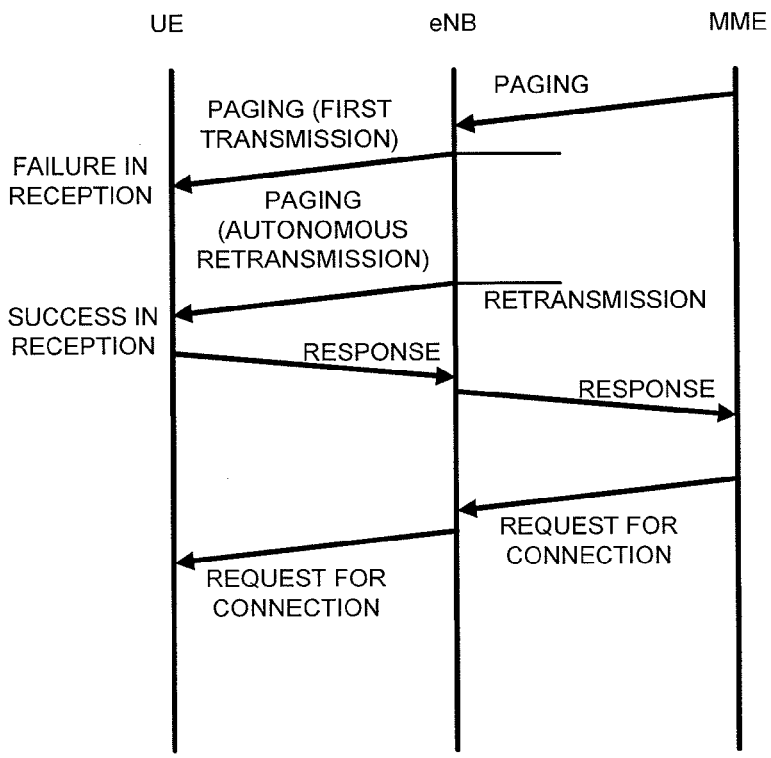
FIG. 12 is a diagram of a sequence among MME, eNB, and UE in this example.
FIG. 13 is a table illustrating a specific example of this example.

FIG. 12 is a diagram of a sequence among MME, eNB, and UE in this example. Additionally, MME corresponds to the gateway devise, eNB to the base station, and UE to the mobile station.

The method requiring no exchange between MME and eNB is preferably incorporated into a scheme for controlling the power of the paging channel. As a rule, the power control of the paging channel is a function of RAN, so an impact by the change should be shut into RAN. With the present invention, a requirement of "the impact is shut into RAN" can be satisfied as mentioned below.

In this example, eNB automatically retransmits a paging message. There is a possibility that when the paging message is transmitted in the first time, eNB cannot receive a response. This is due to one of two reasons, i.e. one reason is that UE did not exist in the cell under control of eNB, and the other reason is that UE was not able to receive the paging message. If eNB retransmits the identical paging message, the identical situation occurs (namely, the reason why eNB cannot receive a response signal is that UE did not exist in the above cell, or UE was not able to receive the second transmission.)

That is, it is expected that there is almost no number of the responses to the second transmission because a possibility that a response is made at the first transmission is high when the error ratio associated with the reception of the paging is low. On the other hand, the responses made at the second transmission are numerous accordingly because a possibility that UE fails in receiving the paging at the first transmission is high when the error ratio is high. The following equations are yielded when it is assumed that a probability that UE fails in receiving the paging at the first transmission, and a possibility that UE fails in receiving the paging at the second transmission are identical to each other.

The number of the UEs that make a response to the first transmission (the number of the responses being made to the first transmission=a probability that UE exists in the corresponding cell*(1−a paging error ratio)

The number of the UEs that make a response to the second transmission (the number of the responses being made at the second transmission=a probability that UE exists in the corresponding cell*a paging error ratio*(1−a paging error ratio).

Upon comparing the number of the UEs having made a response to the first transmission of the paging message with the number of the UEs having made a response to the second transmission thereof, eNB can estimate an error ratio of the paging over the current propagation path, and as a result, can control a reliability associated with the paging channel transmission (namely, the transmission power of the paging channel).

A table shown in FIG. 13 illustrates a specific example. Herein, the number of the cells in a tracking area is defined as 4, and when it is assumed that the UEs are uniformly exists, a probability that a certain UE exists in the cell becomes 25%. In this example, a case 1 that the paging error ratio is 40%, and a case 2 that the paging error ratio is 1% are shown, namely a case that the transmission power of the paging channel has been set correctly, and a case that it has not been set correctly are shown.

In the case that the transmission power of the paging has not been set correctly, 150 UEs make a response to the first transmission of the paging, and 60 UEs make a response to the second transmission of the paging. So as to obtain the paging error ratio, it is calculated from a ratio (=60/150) of these two numbers of UEs (the numbers of the responses).

In the case that the transmission power of the paging has been set correctly, 247 UEs make a response to the first transmission of the paging, and 2 UEs make a response to the second transmission. So as to obtain the paging error ratio, it is calculated from a ratio (=2/247) of these two numbers of UEs (the numbers of the responses).

That is, eNB compares these two numbers of UEs (the error ratio of the paging being gained from two numbers of UEs, which corresponds to the reception error ratio of the paging information of the present invention), thereby making it possible to estimate whether or not the current transmission power of the paging channel is correct. In addition, eNB can control the transmission power of the paging channel based upon this judgment.

As mentioned above, in accordance with this example, the power control of the paging channel is shut into RAN, so there is no exchange between MME and eNB in terms of the power control of the paging channel.

That reason is that eNB selectively retransmits the paging message in order to collect the statistics of success ratios at the first transmission of the paging and the second transmission of the paging.

Further, the base station can adequately set the transmission power of the paging channel in the cell under control thereof, based upon the paging response ratios at the first transmission and the second transmission.

The 1st invention of the present embodiment is characterized in that a communication system configured of a gateway device, at least one base station or more, and at least one mobile station or more, wherein: said base station comprises: a measurement unit for receiving predetermined information associate with said mobile station from said gateway device, changing a radio resource amount being employed for transmitting said predetermined information, transmitting said predetermined information to the mobile station, and measuring statistics associate with completion of a communication process including at least a response to said predetermined information; and a reception error ratio calculation unit for calculating a reception error ratio of said predetermined information based upon said statistics; and said mobile station comprises an information response unit for, when receiving said predetermined information, transmitting a response signal to said base station.

The 2nd invention of the present embodiment in the above-mentioned invention is characterized in that said base station comprises a radio resource control unit for, based upon said reception error ratio of said predetermined information, controlling the radio resource amount being employed for transmitting said predetermined information.

The 3rd invention of the present embodiment in the above-mentioned invention is characterized in that said change of the radio resource amount is one of a change of a transmission power being employed for transmitting the predetermined information, a change of a modulation technique, and a change of a coding ratio, or a combination thereof.

The 4th invention of the present embodiment in the above-mentioned invention is characterized in that said predetermined information is paging information.

The 5th invention of the present embodiment in the above-mentioned invention is characterized in that said measurement unit comprises: an autonomous retransmission unit for autonomously retransmitting the paging information at a predetermined probability when a signal of a response to paging information transmission cannot be received; and a response number-of-times measurement unit for measuring a number of times of the responses to first transmission of the paging information, and a number of the times of the responses at the time of retransmitting the paging information; and said reception error ratio calculation unit comprises a paging information reception error ratio calculation unit for calculating a reception error ratio of the paging information based upon said number of times of the responses to the first transmission of the paging information, and said number of the times of the responses at the time of retransmitting the paging information.

The 6th invention of the present embodiment in the above-mentioned invention is characterized in that said response number-of-times measurement unit measures a number of times Npage of autonomous retransmission processes, a number of times Nres1 of the reception of the responses to first transmission of the paging information, and a number of times Nres2 of the reception of the responses to transmission of the retransmitted paging information: and said paging information reception error ratio calculation unit: calculates a first response probability Pres1 from Pres1=Nres1/Npage; calculates a retransmission response probability Pres2 from Pres2=Nres2/Npage; and calculates a reception error ratio Perr from Perr=Pres2/Pres1.

The 7th invention of the present embodiment in the above-mentioned invention is characterized in that said response number-of-times measurement unit measures a number of times Nres1 of the reception of the responses to first transmission of the paging information, and a number of times Nres2 of the reception of the responses to transmission of the retransmitted paging information: and said paging information reception error ratio calculation unit calculates a reception error ratio Perr from Perr=Nres2/Nres1.

The 8th invention of the present embodiment in the above-mentioned invention is characterized in that said measurement unit comprises: a paging information transmission power control unit for transmitting the paging information at a predetermined probability by employing a current transmission power, a transmission power smaller than said current transmission power, and a transmission power larger than said current transmission power; and a response number-of-times measurement unit for measuring a number of times of the responses to the paging information at each transmission power; and said reception error ratio calculation unit comprises a paging information reception error ratio calculation unit for, based upon said number of times of the responses to the paging information at each transmission power, calculating one of a reception error ratio of the paging information at the time of the current transmission power, and a reception error ratio of the paging information at the time of the transmission power smaller than said current transmission power, or both.

The 9th invention of the present embodiment in the above-mentioned invention is characterized in that said response number-of-times measurement unit measures a number of times Npage of the transmission of the paging information at the current transmission power, a number of times Nres of the reception of the responses to the above transmission of the paging information, a number of times Npage_high of the transmission of the paging information at the transmission power higher than the current transmission power, a number of times Nres_high of the reception of the responses to the above transmission of the paging information, a number of times Npage_low of the transmission of the paging information at the transmission power lower than the current transmission power, and a number of times Nres_low of the reception of the responses to the above transmission of the paging information: and said paging information reception error ratio calculation unit: calculates a response probability Pres_current that the response to the paging information at the current transmission power is made from Pres_current=Nres/Npage; calculates a response probability Pres_low that the response to the paging information at the transmission power lower than the current transmission power is made from Pres_low=Nres_low/Npage_low; calculates a response probability Pres_high that the response to the paging information at the transmission power higher than the current transmission power is made from Pres_high=Nres_high/Npage_high; calculates a reception error ratio Perr of the paging information at the time of the current transmission power from Perr=1−Pres_current/Pres_high; and calculates a reception error ratio Perr_low of the paging information at the transmission power lower than the current transmission power from Perr_low=1−Pres_low/Pres_high.

The 10th invention of the present embodiment in the above-mentioned invention is characterized in that said radio resource control unit takes a control so that the transmission power of the paging information become small in a situation where the reception error ratio of the paging information is smaller than a permissible reception error ratio, and yet is within a permissible range.

The 11th invention of the present embodiment in the above-mentioned invention is characterized in that said radio resource control unit takes a control so as to: compare the reception error ratio Perr of the paging information at the time of the current transmission power with a predetermined error ratio; raise the transmission power of the paging channel to a level higher than the current transmission power within a permissible range when said reception error ratio Perr is larger than the predetermined error ratio; compare the reception error ratio Perr_low of the paging information at the transmission power lower than the current transmission power with a predetermined error ratio when said Perr is smaller than the predetermined error ratio; and lower the transmission power of the paging channel to a level lower than the current transmission power within a permissible range when said Perr_low is smaller than the predetermined error ratio.

The 12th invention of the present embodiment in the above-mentioned invention is characterized in that said mobile station controls intermittent reception that corresponds to a retransmission interval of the paging information, and when having received paging information, transmits a signal of a response to the above paging information.

The 13th invention of the present embodiment is characterized in that a base station in a communication system, comprising: a measurement unit for changing a radio resource amount being employed for transmitting predetermined information, transmitting said predetermined information to a mobile station, and measuring statistics associate with completion of a communication process including at least a response to said predetermined information; and a reception error ratio calculation unit for calculating a reception error ratio of said predetermined information based upon said statistics.

The 14th invention of the present embodiment in the above-mentioned invention is characterized in that said base station in a communication system comprises a radio resource control unit for, based upon said reception error ratio of said predetermined information, controlling the radio resource amount being employed for transmitting said predetermined information.

The 15th invention of the present embodiment in the above-mentioned invention is characterized in that said change of the radio resource amount is one of a change of a transmission power being employed for transmitting said predetermined information, a change of a modulation technique, and a change of a coding ratio, or a combination thereof.

The 16th invention of the present embodiment in the above-mentioned invention is characterized in that said predetermined information is paging information.

The 17th invention of the present embodiment in the above-mentioned invention is characterized in that said measurement unit comprises: an autonomous retransmission unit for autonomously retransmitting the paging information when a signal of a response to paging information transmission cannot be received at a predetermined probability; and a response number-of-times measurement unit for measuring a number of times of the responses to first transmission of the paging information, and a number of the times of the responses at the time of retransmitting the paging information; and said reception error ratio calculation unit comprises a paging information reception error ratio calculation unit for calculating a reception error ratio of the paging information based upon said number of times of the responses to the first transmission of the paging information, and said number of the times of the responses at the time of retransmitting the paging information.

The 18th invention of the present embodiment in the above-mentioned invention is characterized in that said response number-of-times measurement unit measures a number of times Npage of the autonomous retransmission processes, a number of times Nres1 of the reception of the responses to the first transmission of the paging information, and a number of times Nres2 of the reception of the responses to the transmission of the retransmitted paging information: and said paging information reception error ratio calculation unit: calculates a first response probability Pres1 from Pres1=Nres1/Npage; calculates a retransmission response probability Pres2 from Pres2=Nres2/Npage; and calculates a reception error ratio Perr from Perr=Pres2/Pres1.

The 19th invention of the present embodiment in the above-mentioned invention is characterized in that said response number-of-times measurement unit measures a number of times Nres1 of the reception of the responses to the first transmission of the paging information, and a number of times Nres2 of the reception of the responses to the transmission of the retransmitted paging information: and said paging information reception error ratio calculation unit calculates a reception error ratio Perr from Perr=Nres2/Nres1.

The 20th invention of the present embodiment in the above-mentioned invention is characterized in that said measurement unit comprises: a paging information transmission power control unit for transmitting the paging information by employing a current transmission power, a transmission power smaller than said current transmission power, and a transmission power larger than said current transmission power at a predetermined probability; and a response number-of-times measurement unit for measuring a number of times of the responses to the paging information at each transmission power; and said reception error ratio calculation unit comprises a paging information reception error ratio calculation unit for, based upon said number of times of the responses to the paging information at each transmission power, calculating one of a reception error ratio of the paging information at the time of the current transmission power, and a reception error ratio of the paging information at the time of the transmission power smaller than said current transmission power, or both.

The 21st invention of the present embodiment in the above-mentioned invention is characterized in that said response number-of-times measurement unit measures a number of times Npage of the transmission of the paging information at the current transmission power, a number of times Nres of the reception of the responses to the above transmission of the paging information, a number of times Npage_high of the transmission of the paging information at a transmission power higher than the current transmission power, a number of times Nres_high of the reception of the responses to the above transmission of the paging information, a number of times Npage_low of the transmission of the paging information at a transmission power lower than the current transmission power, and a number of times Nres_low of the reception of the responses to the above transmission of the paging information: and said paging information reception error ratio calculation unit: calculates a response probability Pres_current that the response to the paging information at the current transmission power is made from Pres_current=Nres/Npage; calculates a response probability Pres_low that the response to the paging information at the transmission power lower than the current transmission power is made from Pres_low=Nres_low/Npage_low; calculates a response probability Pres_high that the response to the paging information at the transmission power higher than the current transmission power is made from Pres_high=Nres_high/Npage_high; calculates a reception error ratio Perr of the paging information at the time of the current transmission power from Perr=1−Pres_current/Pres_high; and calculates a reception error ratio Perr_low of the paging information at the transmission power lower than the current transmission power from Perr_low=1−Pres_low/Pres_high.

The 22nd invention of the present embodiment in the above-mentioned invention is characterized in that said radio resource control unit takes a control so that the transmission power of the paging information become small in a situation where the reception error ratio of the paging information is smaller than a permissible reception error ratio, and yet is within a permissible range.

The 23rd invention of the present embodiment in the above-mentioned invention is characterized in that said radio resource control unit takes a control so as to: compare the reception error ratio Perr of the paging information at the time of the current transmission power with a predetermined error ratio; raise the transmission power of the paging channel to a level higher than the current transmission power within a permissible range when said reception error ratio Perr is larger than the predetermined error ratio; compare the reception error ratio Perr_low of the paging information at the transmission power lower than the current transmission power with a predetermined error ratio when said Perr is smaller than the predetermined error ratio; and lower the transmission power of the paging channel to a level lower than the current transmission power within a permissible range when said Perr_low is smaller than the predetermined error ratio.

The 24th invention of the present embodiment is characterized in that a mobile station in a communication system comprising a gateway device, at least one mobile station or more, and a base station for transmitting paging information received from said gateway device to said mobile station, and autonomously retransmitting the paging information when a signal of a response to paging information transmission cannot be received, comprising a means for controlling intermittent reception that corresponds to a retransmission interval of the paging information, and for, when having received paging information, transmitting a signal of a response to the above paging information to the base station.

The 25th invention of the present embodiment is characterized in that a communication method comprises: changing a radio resource amount being employed for transmitting predetermined information, transmitting said predetermined information to a mobile station, and measuring statistics associate with completion of a communication process including at least a response to said predetermined information; and calculating a reception error ratio of said predetermined information based upon said statistics.

The 26th invention of the present embodiment in the above-mentioned invention is characterized in that said communication method comprises controlling the radio resource amount being employed for transmitting said predetermined information based upon said reception error ratio of said predetermined information.

The 27th invention of the present embodiment in the above-mentioned invention is characterized in that said predetermined information is paging information.

The 26th invention of the present embodiment is characterized in that a program of a base station, causing the base station to execute the processes of: changing a radio resource amount being employed for transmitting predetermined information, transmitting said predetermined information to a mobile station, and measuring statistics associate with completion of a communication process including at least a response to said predetermined information; and calculating a reception error ratio of said predetermined information based upon said statistics.

The 29th invention of the present embodiment in the above-mentioned invention is characterized in that said program causes the base station to execute a process of, based upon said reception error ratio of said predetermined information, controlling the radio resource amount being employed for transmitting said predetermine information.

The 30th invention of the present embodiment in the above-mentioned invention is characterized in that said predetermined information is paging information.

This application is based upon and claims the benefit of priority from Japanese patent application No. 2007-118385, filed on Apr. 27, 2007, the disclosure of which is incorporated herein in its entirety by reference.

The invention claimed is:

1. A communication system configured of a gateway device, at least one base station or more, and at least one mobile station or more, wherein:
   said base station comprises:
   a measurement unit for receiving predetermined information associate with said mobile station from said gateway device, changing a radio resource amount being employed for transmitting said predetermined information, transmitting said predetermined information to the mobile station, and measuring statistics associate with completion of a communication process including at least a response to said predetermined information; and
   a reception error ratio calculator for calculating a reception error ratio of said predetermined information based upon said statistics; and
   said mobile station comprises an information response unit for, when receiving said predetermined information, transmitting a response signal to said base station,
   wherein said predetermined information is paging information,
   wherein:
   said measurement unit comprises:
   a paging information transmission power control unit for transmitting the paging information at a predetermined probability by employing a current transmission power, a transmission power smaller than said current transmission power, and a transmission power larger than said current transmission power; and
   a response number-of-times measurement unit for measuring a number of times of the responses to the paging information at each transmission power; and
   said reception error ratio calculation unit comprises a paging information reception error ratio calculation unit for, based upon said number of times of the responses to the paging information at each transmission power, calculating one of a reception error ratio of the paging information at the time of the current transmission power, and a reception error ratio of the paging information at the time of the transmission power smaller than said current transmission power, or both,
   wherein: said response number-of-times measurement unit measures a number of times Npage of the transmission of the paging information at the current transmission power, a number of times Nres of the reception of the responses to the above transmission of the paging information, a number of times Npage_high of the transmission of the paging information at the transmission power higher than the current transmission power, a number of times Nres_high of the reception of the responses to the above transmission of the paging information, a number of times Npage_low of the transmission of the paging information at the transmission power lower than the current transmission power, and a number of times Nres_low of the reception of the responses to the above transmission of the paging information: and
   said paging information reception error ratio calculator:
   calculates a response probability Pres_current that the response to the paging information at the current transmission power is made from Pres_current=Nres/Npage;
   calculates a response probability Pres_low that the response to the paging information at the transmission power lower than the current transmission power is made from Pres_low=Nres_low/Npage_low;
   calculates a response probability Pres_high that the response to the paging information at the transmission power higher than the current transmission power is made from Pres_high=Nres_high/Npage_high;
   calculates a reception error ratio Perr of the paging information at the time of the current transmission power from Perr=1−Pres_current/Pres_high; and
   calculates a reception error ratio Perr_low of the paging information at the transmission power lower than the current transmission power from Perr_low=1−Pres_low/Pres_high.

2. A communication system according to claim 1, wherein said radio resource controller takes a control so as to:
   compare the reception error ratio Perr of the paging information at the time of the current transmission power with a predetermined error ratio;
   raise the transmission power of the paging channel to a level higher than the current transmission power within a permissible range when said reception error ratio Perr is larger than the predetermined error ratio;
   compare the reception error ratio Perr_low of the paging information at the transmission power lower than the current transmission power with a predetermined error ratio when said Perr is smaller than the predetermined error ratio; and
   lower the transmission power of the paging channel to a level lower than the current transmission power within a permissible range when said Perr_low is smaller than the predetermined error ratio.

3. A base station in a communication system, comprising:
   a measurement unit for changing a radio resource amount being employed for transmitting predetermined information, transmitting said predetermined information to a mobile station, and measuring statistics associate with completion of a communication process including at least a response to said predetermined information; and a reception error ratio calculator for calculating a reception error ratio of said predetermined information based upon said statistics, wherein said predetermined information is paging information, wherein:

said measurement unit comprises:

a paging information transmission power controller for transmitting the paging information by employing a current transmission power, a transmission power smaller than said current transmission power, and a transmission power larger than said current transmission power at a predetermined probability; and a response number-of-times measurement unit for measuring a number of times of the responses to the paging information at each transmission power; and said reception error ratio calculator comprises a paging information reception error ratio calculator for, based upon said number of times of the responses to the paging information at each transmission power, calculating one of a reception error ratio of the paging information at the time of the current transmission power, and a reception error ratio of the paging information at the time of the transmission power smaller than said current transmission power, or both, wherein:

said response number-of-times measurement unit measures a number of times Npage of the transmission of the paging information at the current transmission power, a number of times Nres of the reception of the responses to the above transmission of the paging information, a number of times Npage_high of the transmission of the paging information at a transmission power higher than the current transmission power, a number of times Nres_high of the reception of the responses to the above transmission of the paging information, a number of times Npage_low of the transmission of the paging information at a transmission power lower than the current transmission power, and a number of times Nres_low of the reception of the responses to the above transmission of the paging information: and said paging information reception error ratio calculator:

calculates a response probability Pres_current that the response to the paging information at the current transmission power is made from Pres_current=Nres/Npage;

calculates a response probability Pres_low that the response to the paging information at the transmission power lower than the current transmission power is made from Pres_low=Nres_low/Npage_low;

calculates a response probability Pres_high that the response to the paging information at the transmission power higher than the current transmission power is made from Pres_high=Nres_high/Npage_high;

calculates a reception error ratio Perr of the paging information at the time of the current transmission power from Perr=1−Pres_current/Pres_high; and calculates a reception error ratio Perr_low of the paging information at the transmission power lower than the current transmission power from Perr_low=1−Pres_low/Pres_high.

4. A base station according to claim 3, wherein said radio resource controller takes a control so as to:

compare the reception error ratio Perr of the paging information at the time of the current transmission power with a predetermined error ratio;

raise the transmission power of the paging channel to a level higher than the current transmission power within a permissible range when said reception error ratio Perr is larger than the predetermined error ratio;

compare the reception error ratio Perr_low of the paging information at the transmission power lower than the current transmission power with a predetermined error ratio when said Perr is smaller than the predetermined error ratio; and lower the transmission power of the paging channel to a level lower than the current transmission power within a permissible range when said Perr_low is smaller than the predetermined error ratio.

* * * * *